United States Patent [19]

Ernster

[11] Patent Number: 4,738,864

[45] Date of Patent: Apr. 19, 1988

[54] PROCESS OF PREPARING PET FOOD WITH IMPROVED CHARACTERISTICS

[76] Inventor: Michael F. Ernster, 22814 LaDeene St., Torrance, Calif. 90505

[21] Appl. No.: 59,208

[22] Filed: Jun. 5, 1987

Related U.S. Application Data

[63] Continuation of Ser. No. 785,493, Oct. 8, 1985, abandoned.

[51] Int. Cl.$^4$ ............................ A23K 1/10; A23B 4/00
[52] U.S. Cl. ...................................... 426/641; 426/480; 426/513; 426/521; 426/657; 426/805
[58] Field of Search ............... 426/641, 657, 480, 513, 426/805, 521

[56] References Cited

U.S. PATENT DOCUMENTS

| | | | |
|---|---|---|---|
| 2,682,466 | 6/1954 | Boyer | 426/104 |
| 3,482,998 | 12/1969 | Carrol et al. | 426/646 |
| 3,488,770 | 1/1970 | Atkinson | 426/104 |
| 3,644,121 | 2/1972 | Boyer et al. | 426/274 |
| 3,662,671 | 5/1972 | Frederiksen et al. | 426/656 |
| 3,662,672 | 5/1972 | Hoer | 426/656 |
| 3,904,776 | 9/1975 | Magnino et al. | 426/641 |
| 4,036,997 | 7/1977 | Ver Burg | 426/272 |
| 4,132,809 | 1/1979 | Desrosier | 426/641 |
| 4,168,322 | 9/1979 | Buckley et al. | 426/641 |
| 4,198,440 | 4/1980 | Le Jeune | 426/641 |
| 4,210,677 | 7/1980 | Huffman | 426/272 |
| 4,238,515 | 12/1980 | Shemer | 426/641 |
| 4,356,206 | 10/1982 | Boldt | 426/641 |
| 4,362,760 | 12/1982 | Fujita et al. | 426/641 |
| 4,363,820 | 12/1982 | Ernster | 426/257 |
| 4,497,844 | 4/1985 | Hice et al. | 426/643 |

OTHER PUBLICATIONS

Market Trends and Outlook For Surimi-Based Foods, John Vondruska, Proceedings of the International Symposium on Engineered Seafood Including Surimi, National Fisheries Institute, Nov. 1985, p. 329.
Using Frozen Minced Fish, Joe M. Regenstein and Carrier E. Regenstein, Proceedings etc., p. 53.
Surimi based Products and Frabrication Processes, Yoichi Kammuri and Takao Fujita, Proceedings etc., p. 254.
Ingredients On Gel Texture, Minoru Okada, Proceedings etc., p. 515.
New Product Concepts Utilizing Surimi In Combination with Isolated Soy Protein, S. Kent Holt, Proceedings etc, p. 531.
New Trends in The Production of Fish Mince and Miced Products In Norway, Ofstad et al., Proceedings etc. p. 651.
Utilization Of Soluble Milk Protein Hydrolysates to Maximize Natural Structure in Fabricated Seafoods, Ernster et al., Proceedings etc., p. 540.

Primary Examiner—R. B. Penland
Attorney, Agent, or Firm—Herb Boswell

[57] ABSTRACT

Pet food can be prepared from animal flesh by a process which includes separation of the flesh portions of the animal from it's bones during a deboning step. This yields a fibrous paste to which is added a quantity of hydrolyzed milk protein. The hydrolyzed milk protein is thoroughly mixed with the fibrous paste. A quantity of salt is then added to the mixture of the hydrolyzed protein and the fibrous paste, and a second mixing is utilized to thoroughly mix the salt into the mixture of the hydrolyzed milk protein and the fibrous paste. The final mixture is then placed into an appropriate mold of a desirable shape. The molded mixture is then quickly heated to 140° F. to heat set the mixture into the mold, and to heat kill any enzymes or micro organisms present in the mixture.

16 Claims, No Drawings

4,738,864

PROCESS OF PREPARING PET FOOD WITH IMPROVED CHARACTERISTICS

This is a continuation of application Ser. No. 785,493, filed Oct. 8, 1985, now abandoned.

BACKGROUND OF INVENTION

This invention is directed to an improved process for the preparation of pet food. More specifically, the invention includes a process which allows the use of normally unutilized fowl, fish, and animal species as the basis of pet food products.

The most common pets are dogs and cats. Both of these animal species are descendants of carniverous ancestors. In view of this, the metabolic needs are based on eating flesh, that is animal products and not products of vegetable origin.

While it may be very convenient to feed one's pet table scraps, this, in effect, is metabolically not good for the pet. Because humans are omnivorous, the human digestive system is capable of handling food of both animal and vegetable origin. Table scraps of vegetable origin, however, are not the natural ancestral diet of dogs and cats. Because of this, common pets not only naturally crave, but nutritionally should have, food substances derived from body parts of other animals.

In the past, many pet foods have utilized scraps or economic cuts left over from meat intended for human consumption. Because these scraps or economic cuts are of a high quality, in order for the pet foods to be economically acceptable, the scraps and economic cuts of the meat products must be diluted with large quantities of binder materials. This not only detracts from the product in consideration of the natural "palate" of the pet, but also detracts from the nutritional value of these products for the pet. Further, these binder materials have little fibrous content as do the pets natural ancestral food supply. In view of this, it is very easy for the pet to become temperamental with respect to its food.

Many types of animal species are under utilized because of their poor acceptance as a human food source. Often times, especially with regard to fish products, an undesirable fish species, if netted, hooked, or the like, is simply returned to the oceans in either a dead or weakened form. This has economic reverberations with respect to other more desired species which is being sought because of the time and cost it takes to initially "catch" these undesirable species and then return them to the oceans. The costs associated with catching the undesired species is added on to the cost of the desired species, making the desired species more expensive.

Recently, equipment has become available for deboning meat and fish. Certain animal species which previously were undesirable because of the economics involved in cleaning and deboning the same, can now be harvested. However, during the automatic cleaning or deboning processes, the flesh portions of the animal body is rendered into a paste. During this process some of the animal body cells are disrupted, releasing the proteins located therein. As a result of this the paste includes certain desired free myofibrillar proteins. The paste also includes proteins originating from smooth muscle, collagenaceous origins, and body organs which are undesirable. These undesirable proteins are present at even further undesirable levels if, in fact, the deboning process is carried out, as for instance, on a fish which still has its head and/or entrails intact. In any event, the paste yielded from the deboning equipment will contain varying amount of soluble or collagenaceous proteins, in addition to the more desirable myofibrillar proteins.

If the paste, as received from the above described deboning process, is utilized directly to form pet food products, during the cooking stage of this procedure the above described undesirable proteins forming a constituent part of that paste tend to leach and run out to form voids in the finished product or form jelly pockets. Both of these result in undesirable end products. While cold water can be utilized to remove these undesirable proteins, it inevitably leads to unaccepted yields rendering the process uneconomical.

BRIEF DESCRIPTION OF THE INVENTION

In view of the above, it is the broad object of this invention to provide for a process of preparing pet food from animal flesh which circumvents the problems of the prior processes. It is a further object of this invention to provide a process for preparing pet food which yields a product having at least a partially fibrous nature which is similar to the ancestral foods of the pets. It is a further object of this invention to provide a process for preparing pet food which is conveniently practiced utilizing existing equipment, which produces an economically viable product, and which can utilize certain heretofore undesirable animal sources.

These and other objects, as will become evident from the remainder of this specification, are achieved in a process for preparing pet food from animals which comprises: separating the flesh from other body parts of an animal, said separation including separation of the flesh portions of said animal from the bones, said separation being conducted so as to maintain said flesh portions at least partial fibrous; adding a quantity of a hydrolyzed milk protein to said flesh's portion; mixing said flesh portion and said hydrolyzed milk protein to distribute said hydrolyzed milk protein into said flesh portion; adding a quantity of salt to said mixture of said hydrolyzed milk protein and said flesh portion; mixing said quantity of said salt into said mixture of said hydrolyzed milk protein and said flesh portion so as to form a mixture; placing said mixture into a mold wherein said mold is capable of essentially maintaining said mixture in the shape of said mold; heating said molded mixture to at least 140° F. to heat kill enzymes and micro organisms in said mixture and to heat set said mixture.

Further, these objects are achieved by deboning the flesh in a mechanical deboner of the type having a rotating drum with a plurality of openings in the surface of the drum where, preferably, the openings are elongated slots so as to allow passage of flesh products through the slot while still maintaining a certain degree of the fibrous structure of these flesh products. In addition, during mixing of the hydrolyzed milk protein and the flesh, preferably a stirrer is used which is incapable of essentially further reducing the size of the fibers of the flesh portion yielded from the deboning process.

The hydrolyzed milk protein would be present in a concentration of at least about 0.25% to about 5% by weight of the weight of the flesh portion. The salt would also be present in the same concentration range of about 0.25% to about 5% by weight of the weight of the flesh portion. During mixing of the flesh portion with both the hydrolyzed milk protein and the salt, it is preferred to keep the temperature below 68° F. and also preferred not to let the temperature rise more than 17° F.

Further, the objects of the invention are achieved by introducing a freezing step inbetween the molding step and the heat setting step. The molded mixture can be frozen solid and cut, sliced, sheared, or otherwise divided, into individual pieces of desirable shapes and configurations. The freezing not only allows for manipulation of the physical configuration of the final product, but also introduces graininess and contributes to the fibrous appearance of the product.

DETAILED DESCRIPTION OF THE INVENTION

For the purposes of this invention, the word 'animal' will be construed broadly, and will not be construed as being limited solely to mammalian species and the like. As such, the word 'animal' would include not only mammalian species, but other vertebrates including fish and fowl, as well as invertebrates such as crustaceans, mollusks, and the like, all which include at least some muscle structure as a portion of their body flesh. The word "flesh", in turn, is to be construed as being equivalent to "edible portion".

While this process would normally be practiced on cleaned decapitated carcasses, it can also be practiced on carcasses which have not been cleaned and/or decapitated. It is preferred, however, because both the head and the entrails include more undesirable protein products, to practice the process on carcasses which have been both cleaned and decapitated.

Many animal species, such as the Pacific mackerel, and the Pacific bonito, do not appeal to the human palate because of their very strong taste. Because of this, these species are not extensively commercially fished. If, indeed, these particular species are inadvertently caught by net, trap, hook, or the like, inevitably they are simply scrapped back to the sea as being unuseable.

Man's four footed pets are not as finicky with respect to their palates as is man himself. Indeed, man's pets sometimes prefer the stronger tasting flesh of many animal species which man, himself, declines to dine upon. Because certain animal species, such as the above mentioned Pacific mackerel and Pacific bonita, do not find their way to man's table, they have flourished and can be economically harvested. While the process of this invention can be practiced on the "economical cuts" or the more undesirable cuts of certain animal species which appeal to the human palate, generally the source of the animal flesh utilized in the process would be derived from animal species not normally utilized for human consumption or animal species which are underutilized because of the inability to economically clean or debone the flesh.

In practice of the process of this invention, an animal carcass is deboned utilizing a suitable deboning apparatus such as that having a rotating drum with openings in the surface of the drum. Preferably, for practice of the process of this invention, the openings in the surface of the drum would be elongated slots. These elongated slots retain the bone on the exterior of the drum, but allow passage of the flesh inside of the drum while maintaining at least a portion of the fibrous nature of the flesh in passing through the slots. This is opposed to drums with round holes. Drums with round holes limit the diameter of the length of fibers which can pass through the holes and, thus, yield a less fibrous product which is less appealing to pets.

A suitable deboner is available from the Stephen Paoli Manufacturing Company. It utilizes elongaged slots in a rotating drum. Insofar as this deboning equipment is commercially available, for the purposes of brevity of this specification, it is sufficient to note that once deboned, utilizing a preferred deboner having elongated slots in its rotating drum, a fibrous paste of flesh is obtained.

During deboning, cells are ruptured releasing the cellular contents which include proteins. Depending upon the animal species which is utilized, and whether or not it is utilized either whole, or preferably with its head and entrails removed, a resulting fibrous paste of flesh will contain varying extracellular quantities of certain proteins which previously were undesirable because they would leach out and run, forming voids in a finished product, or would cause jelly pockets within the finished product.

In the process of this invention, the totality of the fibrous paste of flesh yielded from the deboning process is transferred to a suitable blender, mixer, or the like, and a quantity of hydrolyzed milk protein is added to the fibrous paste. The quantity of hydrolyzed milk protein will be at least 0.25% by weight of the weight of the fibrous paste to an amount of about 5% by weight of the weight of the fibrous paste. While a greater amount of the hydrolyzed milk protein could be added, an amount of 0.25% to 5% is sufficient to practice the invention, and any amount in access of this, while supplying a nutritious milk protein content to the product of the process, would be economically unjustified because of the cost differential between the animal flesh and the hydrolyzed milk protein.

A variety of hydrolyzed milk proteins could be utilized, such as a hydrolyzed milk protein sold by Excelpro, Inc., Los Angeles, Calif. under the tradename of "Luxembourg Cheese Factory Milk Protein Hydrolysate".

The fibrous paste yielded during the deboning process and the hydrolyzed milk protein are mixed together in a suitable blender. There are commercial blenders which can be utilized. However, it is preferred to use a blender which will not further cut, tear, or shear the flesh to any significant extent beyond that resulting from the deboning procedure. Suitable as such a blender would be a ribbon type blender having an agitator wherein tubing has been substituted for the ribbons on the agitator, with the tubing spaced away from the vessel wall of the blender to eliminate any additional shear, tear, or cutting upon rotation of the agitator within the vessel of the blender.

The hydrolyzed milk protein is mixed with the fibrous paste from the deboning procedure to thoroughly mix in the hydrolyzed milk protein with the fibrous paste. This mixes the hydrolyzed protein with any free water within the fibrous paste and any soluble native extracellular proteins within the paste. Generally, these would be proteins of collagenaceous origin or proteins from smooth muscle or internal organs of the animal species utilized in the process.

During a subsequent heating step, as described below, the hydrolyzed milk protein produces a viscous protein matrix with these soluble native extracellular proteins to hold them in position during both the heating step and in the final product achieved from the process.

After thoroughly mixing the hydrolyzed milk protein with the fibrous paste, a quantity of salt is next mixed in. The salt is added in an amount from about 0.25% to about 5% by weight of the weight of the fibrous paste. It is added to the mixture of the fibrous paste and the hydrolyzed milk protein in the blender described for mixing of the hydrolyzed milk protein and the fibrous paste. Additionally, at this time other ingredients can be added. These would be additives such as dextrose, phosphates, pH modifiers, vitamins, mineral, and other fortifiers.

The salt, and any further ingredients, are thoroughly mixed in with the previous contents in the blender. Mixing times for both the mixing of the hydrolyzed milk protein with the fibrous paste and salt into the mixture of the hydrolyzed milk protein and the fibrous paste would be from about 30 seconds to about 60 minutes. The time chosen for each of the mixing steps would be dependent upon the original animal flesh utilized, the amounts of the hydrolyzed milk protein and salts added, the temperature of the components, and other factors as are known in the food processing arts.

For utilization of under utilized species such as Pacific mackerel or the Pacific bonita, preferbaly both the hydrolyzed milk protein and the salt would be present at about from 1% to about 2% by weight of each of these components per the weight of the fibrous paste yielded from the deboning step. Mixing times would be for about 3 minutes for each of the mixing steps. That is, the first mixing step in mixing the hydrolyzed milk protein with the fibrous paste, and the second mixing step of mixing the salt into the mixture yielded from the first mixing step. In any event, mixing would be performed in each of these steps for a time period to thoroughly mix the added ingredients into the existing products in the blender. During the mixing process in mixing either/or both of the hydrolyzed milk protein and the salt, mixing alternatively could be carried out in either a vacuum or an atmospheric massager.

During mixing of both the hydrolyzed milk protein into the fibrous paste, and adding the salt into the mixture of the hydrolyzed milk protein and the fibrous paste, mixing should be carried out at a temperature below 68° F. in order to inhibit both enzymatic and microbiological processes which would deteriorate the quality of the finished product from the process. Further, the temperature during mixing should not be allowed to rise more than 17° F. to also insure inhibition of undesirable enzymatic or microbiological processes. Thus, if mixing was initiated at 46° F., cooling steps should be taken in order to insure that the final temperature of the mixture never exceeds 57° F. even though 57° F. is less than the above noted 68° F. This is as is known in the arts with respect to the handling of animal flesh products. In order to insure that the above referred to temperatures are not exceeded, the mixing vessel could be equipped, if necessary, with appropriate refrigeration or cooling equipment.

After both the hydrolyzed milk protein and the salt is thoroughly mixed with the fibrous paste of the animal flesh, the mixture is placed into an appropriate container or mold such as a sausage casing, a ham casing, a box, tube, or sheet, or other such mold. The mold chosen, and the shape of the mold, will be determined by the further manufacturing steps, or the shape and configuration of the final product. In any event, the mixture is placed into an appropriate mold or container.

Depending upon the particular animal flesh which is utilized during the process, the molded mixture is now either subjected to freezing so as to solidify the mixture, and then subjected to heating to set the mixture, or directly heated to set the mixture. The choice of introducing the freezing process step depends upon the animal species and the physical form of the final product. As for instance, with the Pacific mackerel it is preferred to freeze the molded mixture prior to the subsequent heating step. Whereas with the use of salmon, it is preferred to directly proceed to the heating step.

When the freezing step is utilized, the molded mixture is conveyed or placed within a storage freezer and allowed to freeze to a solid state. This is best conducted as a slow freeze in a storage freezer compared to an instantaneous freeze utilizing very cold liquids and the like. By slowly allowing the molded mixture to freeze, ice crystals develop within the molded mixture which give the final product an added appearance of grain and fiber.

Once the mixture is frozen solid, it can be cut by sawing, cutting, chopping, shearing, and the like, all of which for the purposes of this specification are considered as cutting processes. The frozen molded mixture is cut into smaller portions which can assume different shapes dictated by the desired visual appearance of the final product. As such, slices, chunks, bone shapes, or even characterized shaped products, can be formed.

The molded mixture, with or without utilization of the freezing step, is then quickly heated to at least 140° F. to heat set the molded mixture into it's final shape. Heating is done at a rapid rate so as to quickly heat the molded mixture with or without freezing, and with or without further cutting to specific shapes. The quick heating is necessary in order to minimize enzymatic and bacterial degradation of the product which might accompany slow heating of the molded mixture.

If the molded product is frozen, it is desirable to cut the product such that smaller pieces or shapes are yielded which can be rapidly heated from the frozen state to about 140° F. to inhibit any enzymatic or bacterial degradation.

Heating can be accomplished by immersing the molded product whether frozen, cut, or simply as the molded mixture, into boiling water for a time sufficient to heat it beyond the 140° F. range and to heat set the mixture. Alternately, the product could be added to cans which are filled with hot gravy or other liquid, and the canned product subjected to autoclaving as is normally practiced in processing canned products. In a further embodiment of the invention, the mold utilized during the molding step of the product can comprise a heatable container which, after introduction of the mixture into the mold, is directly heated. If such a heatable mold or container is utilized it is preferred to shape this container in a manner so as to facilitate transfer of heat quickly throughout the totality of the mixture in the mold so as to inhibit the above referred to enzymatic or bacterial degradation.

The final heating of the product not only heatkills enzymes and micro organisms originating from the animal flesh, but further sets the final product into a firm mass suitable for utilization as pet food. The hydrolyzed milk protein present in this final product reacts during the heating cycle with the soluble protein portions to form viscous protein matrixes which further contribute to both the physical stability of the shape of the final product as well as the final texture of the product. The salt added to the fibrous paste reacts with the desirable myofibrillar protein portions derived from the animal flesh to bind these proteins together into a viscous matrix.

It is thus evident that there are multiple binding forces present in the final product. These include the heat set, the hydrolysized milk protein-soluble protein matrix, and the salt-myofibrillar protein matrix. Further, since the totality of the fibrous nature of the unprocessed flesh is not destroyed in the deboning step, it contributes to the structure of the final product.

I claim:

1. A process for preparing pet food from animal flesh which comprises:
   separating the flesh from other body parts of an animal, said separation including separation of the flesh portions of said animal from the bones, said separation being conducted so as to maintain said flesh portions at least partially fibrous;
   adding a quantity of at least about 0.25% by weight of a matrix forming component consisting essentially of a hydrolyzed milk protein to said flesh portion;
   mixing said flesh portion and said hydrolyzed milk protein to distribute said hydrolyzed milk protein into said flesh portion;
   adding a quantity of salt of from about 0.25% to about 5% by weight to said mixture of said hydrolyzed milk protein and said flesh portion;
   mixing said quantity of said salt into said mixture of said hydrolyzed milk protein and said flesh portion so as to form a mixture;
   said mixing of said hydrolyzed milk protein into said flesh portion and said mixing of said salt into said mixture of said hydrolyzed milk protein and said flesh portion conducted at a temperature sufficient to essentially inhibit enzymatic and microbiological deterioration of said flesh during said mixing, and further said mixing being conducted so as to maintain the at least partially fibrous nature of said flesh;
   placing said mixture into a mold wherein said mold is capable of essentially maintaining said mixture in the shape of said mold;
   heating said molded mixture to at least 140° F. to heat kill enzymes and micro organisms in said mixture and to heat set said mixture.

2. The process of claim 1 wherein:
said flesh is deboned by placing said flesh in a mechanical deboner having a rotating drum with a plurality of openings in the surface of said drum wherein the flesh portion of an animal is capable of passing through said openings as a paste and the bones are retained on the interior of said drum.

3. The process of claim 2 wherein:
said openings in said drum are elongated slots.

4. The process of claim 1 wherein:
said hydrolyzed milk protein is mixed with said flesh portion in a stirrer essentially incapable of reducing the size of fibers in said flesh portion.

5. The process of claim 4 wherein:
said stirrer is a ribbon type blender having an agitator with tubing substituted for the ribbon portions of the agitator and further including said tubing being spaced away from the sides of the vessel of said blender.

6. The process of claim 1 wherein:
said hydrolyzed milk protein is utilized in a concentration of from about 0.25% to about 5% by weight of the weight of the fleshy portion.

7. The process of claim 6 wherein:
said hydrolyzed milk protein is present from about 1% to about 2% by weight of the weight of said flesh portion.

8. The process of claim 7 wherein:
said salt is present in an amount of about 1% to about 2% by weight of the weight of said flesh portion.

9. The process of claim 1 including:
maintaining the temperature of said flesh portions, said hydrolyzed milk protein, and said salt, below 68° F. during the mixing of said mixture.

10. The process of claim 9 including:
limiting the temperature rise during mixing of said flesh portion, said hydrolyzed milk protein, and said salt, to less than 17° F. during said mixing.

11. The process of claim 1 including:
freezing said molded mixture prior to heating of said mixture.

12. The process of claim 11 further including:
cutting said frozen molded mixture into individual pieces of a desired configuration.

13. The process of claim 12 wherein:
said flesh is deboned by placing said flesh in a mechanical deboner having a rotating drum with a plurality of elongated slots in the surface of said drum wherein the flesh portions of an animal are capable of passing through said elongated slots as a paste, and the bones are retained on the interior of said drum.

14. The process of claim 12 wherein:
said hydrolyzed milk protein is utilized in a concentration of from about 0.25% to about 5% by weight of the weight of the flesh portion.

15. The process of claim 14 including:
maintaining the temperature of said flesh portions, said hydrolyzed milk protein, and said salt, below 68° F. during the mixing of said mixture.

16. The process of claim 15 including:
limiting the temperature rise during mixing of said flesh portion, said hydrolyzed milk protein, and said salt, to less than 17° F. during said mixing.

* * * * *

UNITED STATES PATENT AND TRADEMARK OFFICE
CERTIFICATE OF CORRECTION

PATENT NO. : 4,738,864
DATED : APRIL 19, 1988
INVENTOR(S) : MICHAEL F. ERNSTER

It is certified that error appears in the above-identified patent and that said Letters Patent is hereby corrected as shown below:

Column 2, line 36, "partial" should be --partially--.
Column 2, line 37, "flesh's" should be --flesh--.
Column 3, line 4, "inbetween" should be --in between--.
Column 4, line 31, "access" should be --excess--.
Column 6, line 31, "it's" should be --its--.

Signed and Sealed this

Sixth Day of June, 1989

*Attest:*

DONALD J. QUIGG

*Attesting Officer*

*Commissioner of Patents and Trademarks*